United States Patent [19]

McCarty

[11] Patent Number: 4,720,284

[45] Date of Patent: Jan. 19, 1988

[54] METHOD AND MEANS FOR SEPARATION OF BLOOD COMPONENTS

[75] Inventor: Read S. McCarty, Hingham, Mass.

[73] Assignee: Neotech, Inc., Rockland, Mass.

[21] Appl. No.: 894,788

[22] Filed: Oct. 3, 1986

[51] Int. Cl.[4] .......................... B01D 21/26; B04B 1/00

[52] U.S. Cl. ...................................... 494/37; 210/927; 494/45; 494/4; 604/410

[58] Field of Search ........................ 494/21, 4, 2, 5, 31, 494/32, 37, 38, 45, 56; 604/410, 6, 131; 210/927, 781, 782, 360.1

[56] References Cited

U.S. PATENT DOCUMENTS 4,316,576 2/1982 Cullis .................................... 494/37
4,402,680 9/1983 Schoendorfer ........................ 494/37
4,416,778 11/1983 Rogers .................................. 494/16
4,482,342 11/1984 Lueptow ............................... 494/37
4,582,606 4/1986 McCarty ............................... 494/21

*Primary Examiner*—Robert W. Jenkins
*Attorney, Agent, or Firm*—Cesari and McKenna

[57] ABSTRACT

In a method of separating different density fluid components, a fluid sample is placed in a first flexible container. The container and its contents are then spun at high speed while controlling the shape of the container so that its side walls spread apart and its bottom flattens to give the container and its contents a relatively small aspect ratio whereby different density components of the fluid contents travel minimum distances while separating in the container to achieve a density distribution in the container, with the densest components of the fluid distal to the spin axis being distributed over a relatively large area surface constituted by the container bottom. The method is particularly applicable to separating different components of human blood. Various apparatus for practicing the method are also disclosed.

19 Claims, 21 Drawing Figures

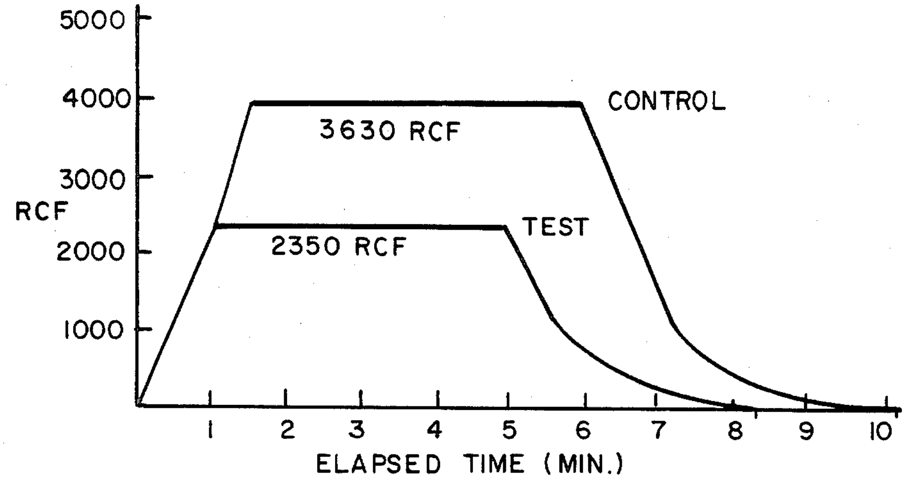
FIG. 10
| | 3 HOUR | 24 HOUR |
|---|---|---|
| TEST A (NO REST) | 5.6 | 6.6 |
| TEST B (1 HR. REST) | 5.8 | 6.3 |
| CONTROL (1 HR. REST) | 5.9 | 6.2 |
COUNT (NO. x $10^{10}$)
FIG 13
| | P.C. COUNT (PRE SPIN) | P.C. COUNT (POST SPIN) | COUNT IN PPP (POST SPIN) |
|---|---|---|---|
| MY TECHNIQUE | 7.5 | 6.5 (87%) | .1 |
| CONTROL TECHNIQUE | 6.2 | 3.8 (61%) | .6 |
COUNT (NO. x $10^{10}$)
FIG. 15
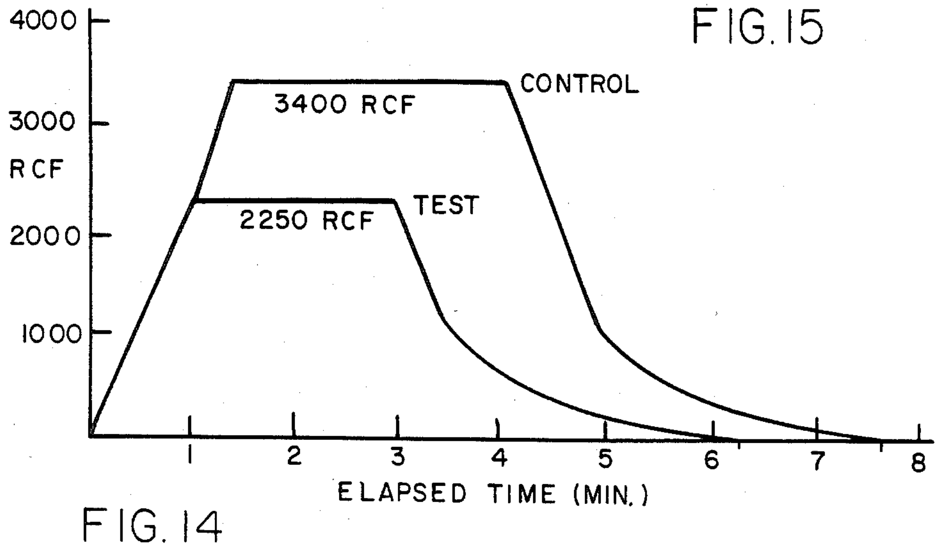
FIG. 14

METHOD AND MEANS FOR SEPARATION OF BLOOD COMPONENTS

BACKGROUND OF THE INVENTION

This invention relates to method and means for aiding the separation of blood components in a blood bag during centrifugation.

Human blood is separated into its various components in order to maximize the benefits of this valuable resource and to provide only the component required by an individual patient. For example, whole blood is typically processed into platelets, plasma and red blood cells.

The cellular components of blood have different densities. With the aid of a centrifuge, the various cell types establish themselves in layers according to their densities. Predetermined and well known centrifuge speed and time ratios are used to accomplish this separation. The red blood cells (RBC), being the most dense of the blood components, settle to the bottom of the fluid column. Above the RBC layer is formed the socalled "buffy coat" and the plasma layer forms above the buffy coat. If the correct time is used in conformance with the normal procedure for separating blood components, platelets are suspended in the plasma layer. After the first spin, the platelet-rich plasma (PRP) is transferred to an empty satellite bag and is centrifuged again at a higher speed for a longer period to further separate the platelet rich plasma (PRP) into platelet-poor plasma (PPP) and platelet concentrate (PC).

In order to harvest the maximum number of platelets from the PRP, the PRP is spun to produce a centrifugal force ranging from 3000 G to 4400 G for eight minutes in the first instance to five minutes in the second instance. This time/speed ratio almost always insures adequate platelet yield, but it results in the platelets impacting one another and clumping together, forming what is commonly called a platelet "button" at the bottom of the primary bag. The degree of centrifugation and resulting severity of button formation determine the degree of platelet damage. The higher the speed and the longer the time the platelets are subjected to that force, the higher the level of loss of platelet viability. Numerous researchers have recommended devising methods of reducing the cell damage caused by the such known harvesting methods, but no workable method has been developed heretofore.

Red blood cells can be separated still further. More particularly, after the separation of PRP, the residual RBC mass is comprised of approximately 70% RBC and 30% plasma. This mass may be centrifuged again at a higher speed, greater than 4000 G, for fifteen to thirty minutes to further separate them according to their agedependent density. The youngest (least dense) RBC's are called neocytes and migrate to the top of the RBC column while the oldest (most dense RBC's), called gerocytes, migrate to the bottom of the RBC column. The residual plasma found in the the RBC mass prior to this last spin is found above the young RBC mass. The older RBC mass is almost totally devoid of plasma.

The benefits of using only young RBCs in the treatment of certain disorders is known. The red blood cells or erythrocytes in donor blood have a certain life span. Actually, human blood contains more or less equal portions of red blood cells of ages between about 0 and 120 days. Thus, in any given sample, there is a certain percentage of neocytes and a certain percentage of gerocytes. Also, human blood contains a relatively large amount of iron, on the order of 108 mg/dl of red cells. Furthermore, the iron content is relatively uniform regardless of the average cell age of the blood sample. There are some patients, those suffering from chronic anemias for example, who depend upon repeated blood transfusions for their survival. Indeed, they may receive donor blood at such a rate that their systems are unable to entirely dispose of the iron content of that blood with the result that those patients suffer from iron overload and may die from complications resulting from this cause.

Since the contribution to iron overload is the same from the oldest transfused red cells which survive only a few hours as from the youngest ones which circulate in the body for months, it has been obvious for some time that a blood transfusion for patients such as this would be much more effective in terms of the ratio of physiological benefit to iron overload if the older red cells were removed from the donor blood and only the younger cells were administered to the patient.

It has also been recognized that the red cells in donor blood have a certain density distribution. Indeed, it turns out that the older red blood cells are more dense than the younger ones. Using this knowledge, attempts have been made to separate the red cells in a donor sample according to their densities so as to segregate the younger red cells or neocytes from the older cells or gerocytes. Some such attempts, described for example in the following publications, involve centrifuging the donor blood:

Murphy, John R., Influence of Temperature and Method of Centrifugation on the Separation of Erythrocytes, *DJ. Lab. Clin. Med.*, August 1973, pp. 34–341; Corash, Lawrence M., et al, "Separation of Erythrocytes According to Age on a Simplified Density Gradient", *J. Lab. Clin. Med.*, July, 1974, pp. 147–151; Piomelli, Sergio, et al, "Separation of Younger Red Cells With Improved Survival in Vivo: An Approach to Chronic Transfusion Therapy", *Proc. Natl. Acad. Sci. USA* 75 (1978), pp. 3474–3477; and Vettore, Luciano, et al, "A New Density Gradient System for the Separation of Human Red Blood Cells", *American Journal of Hematology,* 8:291 at Volume 8 (1980), pp. 291–297.

A centrifuge is usually used to separate different blood components by magnifying the different densities of the various blood components. Heretofore, the environment in which the blood bag is placed has been left to chance, with several factors having a negative influence on the quality of the separated cells. Typically, the blood bag filled with blood fluid is placed directly in a centrifuge cup along with 1, 2 or 3 empty satellite bags (used to receive the various separated components) connected to the blood bag by flexible plastic tubing, the entirety constituting an integral, fluid tight bag set. Rubber disks are used to balance the opposing centrifuge cups and are randomly placed upon or around the various bags in an uncontrolled manner. During centrifugation, the force exerted on the primary bag causes the blood fluid to compress into the bottom of the centrifuge cup. The manner in which the bag filled with blood fluid is compressed during centrifugation and the interaction of the associated empty bags upon compression with the filled bag are uncontrolled and left to chance.

At times, wrinkles or folds occur in the filled bag which trap heavier cells associated with the layer of the bag normally occupied by lighter cells, thus contaminating the various components with each other. In addition, the height-to-width ratio or aspect ratio of the blood fluid volume in the blood bag is random. The greater the ratio, the greater the distance cells must travel to reach their final density strata. The greater the distance, the larger the force and centrifugation time required to accomplish the separation. On the other hand, a maximum aspect ratio after centrifugation is advantageous because it minimizes the liklihood of inadvertant remixing of the separated cells.

At the end of centrifugation, the primary bag retains more or less the shape assumed during the centrifugation process. Thus, when the bag is compressed, the various separated components may be in close proximity (low aspect ratio) and subject to inadvertant remixing as the primary and satellite bags are pulled from the centrifuge cup. The tendency to remix may also be increased due to the primary and satellite bags wedging themselves together. The balancing disks further compound this problem.

After centrifugation, the first blood bag containing the blood components, separated into their density-specific components, is removed from the centrifuge cup and placed in an expressor which is a mechanical squeezing device. The tubes between the first bag and the empty satellite bags are either opened or pinched off according to the types of components to be transferred into those bags. The primary bag is then gently squeezed from bottom to top so that the upper layers of the blood volume are transferred to the satellite bags.

The removal of the bags from the centrifuge cup, their placement on the mechanical expressor and the monitoring of the correct volumes of the primary and satellite bags are steps which are time consuming, prone to technician error and may result in cross-contamination of the separated blood components.

One disadvantage of this known separation method is the occurance of contamination of one cell component with another due to the uncontrolled placement of the bags which may result in wrinkles that trap cells in the incorrect region of a bag. Another disadvantage of the known method is the time associated with the separation of the blood fluid into its density-dependent layers. If the unseparated blood column has a high aspect ratio, the cells of various densities have greater bag lengths to travel to reach their appropriate position. The greater the aspect ratio, the greater the spin force or time which must be used to accomplish the separation and the greater the spin force or time, the greater the cell component damage. This effect is particularly pronounced in the separation of platelets from PRP.

U.S. Pat. Nos. 4,416,778 and 4,582,606 disclose devices for harvesting neocytes. Both of these approaches involve removal of the older, more dense RBC (gerocytes) from the bottom of the RBC column after centrifugation. These approaches have merit, but will result in contamination of the young cells (neocytes) remaining in the primary bag due to adhesion of some of the older cells (gerocytes) to the primary bag walls. In addition, the older cells in both patented apparatus are transferred into round flexible bags. The percentage of RBC in the bags is often greater than 98% and the lack of plasma or other nutritional fluid in the bags may result in cell death. Further, the 98% RBC mass is not transfusable without the addition of solution to lower the RBC percentage to from 50% to 70%. The addition of such solution is not provided for in those patented apparatus, nor is there provision for withdrawing the RBCs to another bag for the dilution step or for any subsequent transfusion.

Still further, the entering of the lower bags of those prior devices through ports, which may be added to those bags, would result in breaking of those closed systems and, thus, require the RBCs to be used within 24 hours. These deficiencies can only be avoided by providing a bag containing the necessary nutritional fluid integrally attached to the bag containing the gerocytes. Such a solution does not appear to be feasible in either of those patented devices.

SUMMARY OF THE INVENTION

Accordingly, the present invention aims to provide an improved method of obtaining blood components, particularly neocyte-enriched RBC from RBC or PC from PRP.

A further object is to provide a method of separating PC from PRP with minimal damage to the platelets.

Another object of the invention is to provide a method of segregating red blood cells or erythrocytes relatively gently according to their age.

Another object of the invention is to provide a method for partitioning the red blood cells in donor blood at a selected point in a blood cell age or density distribution or continuum.

A further object of the invention is to provide a method of segregating old and new blood cells which can be performed quickly and reliably by relatively unskilled personnel.

Yet another object is to provide a method of separating different components of a liquid by centrifuging which minimizes damage to those components during such separation process.

Still another object of the invention is to provide separation apparatus which produces one or more of the above advantages.

Another object of the invention is to provide apparatus for segregating or partitioning the red blood cells in donor blood at a selected point in a blood cell age or density continuum.

Another object of the invention is to provide apparatus for preparing neocyte-enriched blood in a completely sterile environment.

A further object of the invention is to provide apparatus for separating and partitioning blood neocytes and blood gerocytes in a sterile condition so that each of these blood components can be used independently of the other.

A further object is to provide apparatus for adding a nutritional solution to separated blood gerocytes in a sterile manner.

Another object is to provide method and means for concentrating blood platelets by centrifuging, while subjecting the platelets to less G force for a shorter time than normally required to harvest platelet concentrate.

A further object is to prepare more viable platelets by reducing the degree of platelet activation caused by centrifugation.

A further object is to provide a fixed environment for the blood column in a blood bag to be centrifuged in order to prevent wrinkles and folds in the bag, thus avoiding the trapping of blood cells at incorrect density layers in the bag.

A further object is to provide separation apparatus, including a blood bag system or set having a tube pathway, which prevents the tube from kinking or collapsing, so as to inhibit the flow of fluids between the various bags of the set.

A further object is to provide a separation apparatus of this type which incorporates an integral expressor so that it automatically accomplishes the partition of one blood component from a second blood component and the separation of these components into different bags while the apparatus and bags are still in the centrifuge.

Other objects will, in part, be obvious and will, in part, appear hereinafter.

The invention accordingly comprises the several steps and the relation of one or more of steps with respect to each of the others, and the apparatus embodying the features of construction, combination of elements and arrangement of parts which are adapted to effect such steps, all as exemplified in the following detailed description, and the scope of the invention will be indicated in the claims.

In accordance with this invention, blood separation with maximum purity is accomplished while the centrifugation RCF/time ratio is minimized to keep centrifuge-related cell damage to a minimum. More particularly, the flexible blood bags comprising the bag set and containing various blood fluids are all contained in a centrifuge cup insert which minimizes the aspect ratio (height-to-width ratio) of the primary bag, while supporting the bags to eliminate wrinkles and the random interference of empty satellite bags and balancing disks with the primary bag containing the blood fluids to be separated.

My apparatus controls the deformation of the bag by providing a predetermined fixed environment for the bag in which the separation can occur. The apparatus is designed to receive an ordinary bag set of, say, two bags connected integrally by tubing and sized to fit in a standard centrifuge cup. The apparatus provides a physical environment which greatly increases the purity of the blood components upon separation and allows the separation to be done in less time or at slower speed than normally used to separate blood components. The slower speed or shorter time causes less blood cell damage than normally associated with components separated by higher centrifugation speeds or longer spin times.

The centrifuge insert apparatus also minimizes the distance cells of different densities must travel in order to reach their density-specific separation layers in the primary bag. In addition, it provides a chamber for the primary bag which forms a base of maximum dimensions which the primary bag conforms to, thus providing a large surface area for the blood platelets to collect upon, thereby minimizing platelet interaction and the severity of platelet button formation and platelet damage. The satellite bags and ancillary balancing disks are supported outside the primary bag chambers. Thus, they do not interfere with the separation process proceeding in the primary bag. Finally, the separated fluids are removed from the top of the primary bag, rather than the bottom thereof as in the above patented apparatus, so that the separation is a "clean" one. In other words, the less dense components are expressed first from the primary bag so the they are not contaminated by more dense components, which tend to adhere to the primary bag walls.

BRIEF DESCRIPTION OF THE DRAWINGS

For a fuller understanding of the nature of the objects of the invention, reference should be had to the following detailed description, taken in connection with the accompanying drawings, in which:

FIGS. 10 to 15 are graphical diagrams showing the benefits of my invention.

DETAILED DESCRIPTION OF THE PREFERRED EMBODIMENTS

Figure 1:
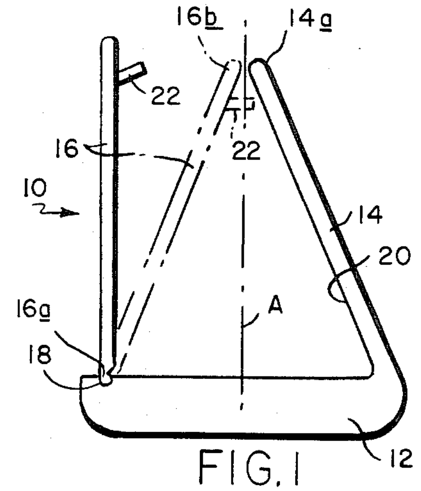
FIG. 1 is a side elevational view of separation apparatus embodying my invention.
Figure 3:
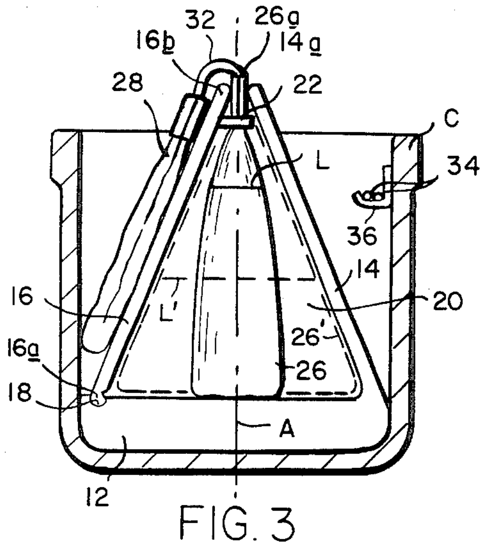
FIG. 3 is a view similar to FIG. 1 with parts in section showing the FIG. 1 apparatus loaded with a blood bag set and positioned for spinning in a centrifuge cup.

Referring to FIG. 1 of the drawings, separation apparatus incorporating my invention is indicated generally at 10. It includes a generally circular base 12 which is sized and contoured to fit at the bottom of a standard centrifuge cup C (FIG. 3). Extending upwardly and inwardly from one side of base 12 is a generally rectangular plate 14. Plate 14 may be an integral extension of base 12 or it may be removably secured to the base by threaded fasteners, pegs or other suitable means. Also extending up from base 12 is a generally rectangular movable plate 16. Plate 16 is essentially a mirror image of plate 14 except that its lower edge is hinged, rather than fixed, to base 12.

In the illustrated apparatus, the hinge is formed by a taper **16*a* at the lower edge of plate 16 which sits in a groove 18 formed in the upper surface of base 12, which groove extends along a chord of that circular base. When seated in groove 18, plate 16 is movable between an open position illustrated in solid lines in FIG. 1 and a closed position shown in phantom in that same figure. As shown in FIG. 1, the upper edge 14*a* of plate 14 lies adjacent to the vertical centerline or axis A of apparatus 10, as does the upper edge 16*b* of plate 16 when that is in its closed position shown in phantom in that figure thereby defining a chamber 20** having a triangular cross-section.

Figure 2:
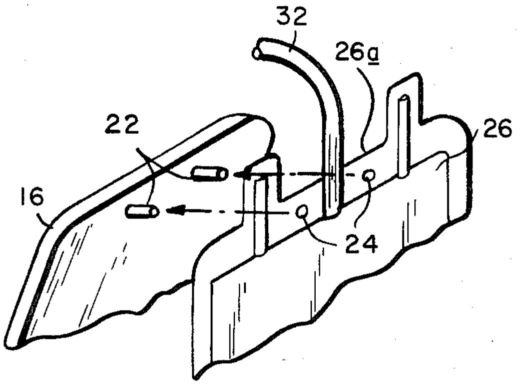
FIG. 2 is a fragmentary isometric view on a larger scale showing the mounting of a more or less standard blood bag set in the FIG. 1 apparatus.

Referring now to FIGS. 1 and 2, a pair of laterally spaced-apart pins 22 are mounted adjacent to the upper edge of plate 16, projecting toward plate 14. Pins 22 are arranged to extend through the pair of openings 24 found in the head piece or header **26*a* of a standard blood bag 26. With plate 16 separated from base 12, header 26*a* is impaled on pins 22 so that the blood bag is suspended adjacent to plate 16. When the lower edge of that plate is seated in groove 18 of base 12, the weight of the bag moves plate 16 to its closed position in FIG. 1 so that the bag is suspended at the vertical centerline or axis A of apparatus 10. The centering of bag 26 in apparatus 10** assures that when the bag is spun in the centrifuge cup as will be described hereinafter, both walls of the bag will be strained to substantially the same extent. Excessive strain in one side might cause thinning and possible rupturing of the bag wall.

Referring now to FIG. 3, bag 26 is the primary bag of a bag set which includes at least one satellite bag 28 connected by a tube 32 to the interior of bag 26 through its header **26*a*. When bag 26 is positioned properly in apparatus 10, it hangs straight down from pins 22 as aforesaid and the upper edge 16*b* of movable plate 16 is urged by the weight of bag 26 towards the upper edge 14*a* of plate 14, thus retaining the bag header 26*a* on pins 22. The satellite bag(s) 28 is draped on the outside surface plate 14 or 16 below the rim of cup C so that there are no kinks in tube 32**.

Usually also one or more balancing weights 34 are positioned on the outside surface of plate 14 or 16 below the rim of cup C to balance the opposing cup as placed in the centrifuge when it is spun at high speed.

Figure 4:
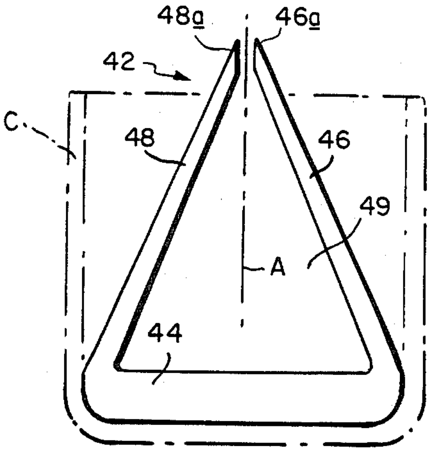
FIG. 4 is a view similar to FIG. 1 showing another embodiment of my invention.
Figure 5:
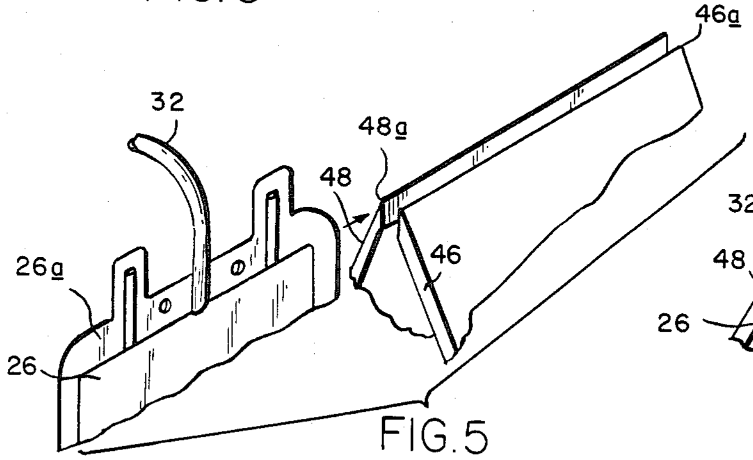
FIG. 5 is a fragmentary isometric view on a larger scale illustrating the loading of a bag set into the FIG. 4 apparatus.
Figure 6:
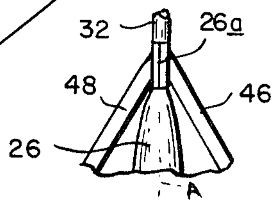
FIG. 6 is a fragmentary sectional view showing the mounting of the bag in the FIG. 4 apparatus.

Refer now to FIG. 4, which illustrates a slightly different apparatus embodiment 42 arranged to be positioned inside a centrifuge cup indicated in phantom at C. Apparatus 42 comprises a circular base 44 having a pair of integral plates 46 and 48 extending up from the base on opposite sides thereof. Plates 46 and 48 are toed-in so that their upper edges **46*a* and 48*a* lie opposite to one another on the centerline or axis A of apparatus 42. Typically, the space 49 inside the apparatus 42 has a generally triangular cross-section. Plates 46 and 48 are flexible and resilient so that their upper ends can be spread apart to permit a blood bag 26 to be slid sideways into the apparatus between the plates 46 and 48 as shown in FIG. 5. When properly positioned in the apparatus, the bag header 26*a* is clamped between the plate upper edges 46*a* and 48*a* so that the bag hangs down in an interior space 49 more or less on axis A of the apparatus as shown in FIG. 6**.

The plates 46 and 48 have sufficient resiliency to prevent the bag header **26*a* from being pulled from between the upper edges of the plate when the loaded apparatus is placed in centrifuge cup C and spun at high speed about the centrifuge axis. As in the FIG. 1 apparatus embodiment 10, any satellite bag(s) 28 and balancing weights 34 are located inside cup C on opposite sides of bag 26. Thus, apparatus 10 and 42 are quite similar except for their modes of retaining bag header 26*a*. In both of these embodiments, the bag hangs straight down as shown in FIGS. 3 and 6 when cup C is stationary. However, when the cup is spun at high speed in a centrifuge, bag 26 spreads out to conform to interior space 20 or 49 of the apparatus as shown in phantom at 26' in FIG. 3. Thus, the aspect ratio of the bag and its contents changes from a maximum to a minimum so that the level of the liquid in bag 26 drops from an upper level L to a lower level L' in FIG. 3. Resultantly, the different density components of the bag contents have less far to travel when stratifying under the centrifuge force produced by the spinning motion. After centrifuging, bag 26 and its contents remain in more or less in their spread-apart condition shown at 26' in FIG. 3**.

Figure 7A:
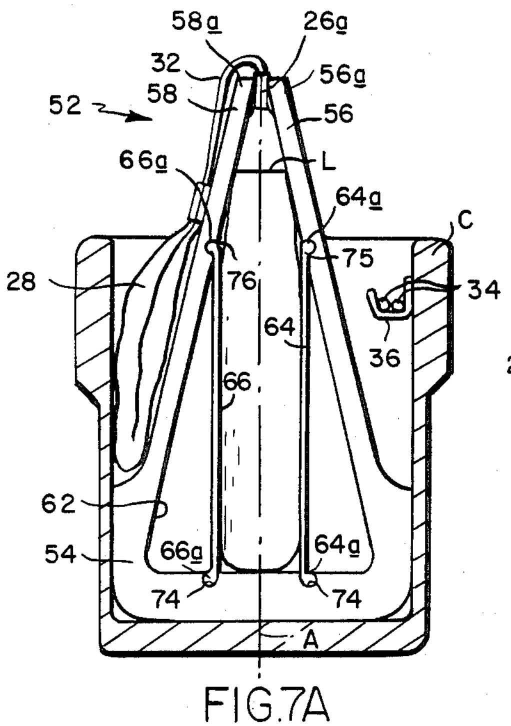
FIGS. 7A to 7C are similar to FIG. 3 a third embodiment of my insert apparatus before, during and after centrifuging in a centrifuge cup.

A third embodiment of my apparatus is indicated generally at 52 in FIG. 7A. Apparatus 52 has a circular base 54 and a pair of opposite side walls 56 and 58 which may be associated with base 54 in accordance with FIG. 1 or FIG. 4 so that the header **26*a* of a blood bag 26 is suspended on pins or clamped between the upper ends 56*a* and 58*a* of the plates so that the bag 26 hangs down inside the triangular apparatus chamber 62 more or less along its vertical axis A. Apparatus 52 differs from the others described above in that it includes a pair of spaced-apart, vertically disposed elastic bands 64 and 66 inside chamber 62 which positively define the maximum aspect ratio of bag 26**.

Elastic bands 64 and 66 have beads **64*a* and 66*a* respectively at their upper and lower ends. The beads at the lower ends of these straps are arranged to be keyed or locked into a pair of spaced-apart grooves 74 formed in the upper surface of base 54 on opposite sides of axis A. The beads at the upper ends of the elastic bands are retained in similar grooves 75 and 76 formed in the interior walls of plates 56 and 58 respectively. When plates 56 and 58 are in their normal relaxed positions shown in FIGS. 7A, the grooves 75 and 76 are located directly above grooves 74 so that the two elastic bands 64 and 66** are vertical, with the distance between them being about one inch for most standard blood bags.

Figure 7B:
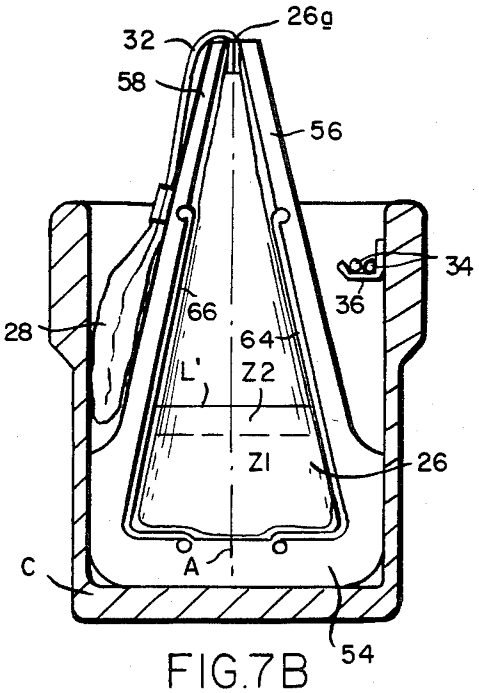

Bag 26 is arranged to be positioned inside apparatus 52 between elastic bands 64 and 66 with its header **26*a* being retained at the upper ends of plates 56 and 58 either by clamping or by pins as discussed above, so that the bag is suspended vertically on axis A, as shown in FIG. 7A. At this time, due particularly to the presence of the elastic bands 64 and 66, the bag 26 and its contents have a maximum aspect ratio which places the level L of the inside the bag at a location near the upper end of the bas as illustrated in FIG. 7A. However, when the centrifuge cup C is spun about the centrifuge axis, the mass of the fluid inside bag 26 causes the bag walls, as well as the elastic bands 64 and 66, to stretch and spread apart until they conform to the walls of the chamber 62**, as shown in FIG. 7B. This gives the bag and its contents a minumum aspect ratio, so that the liquid level drops to the position L' shown in FIG. 7B.

Figure 7C:
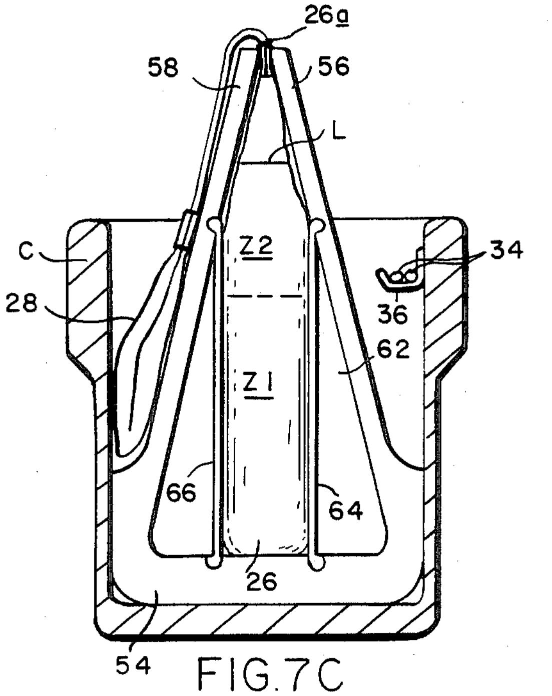

As the centrifuge slows down after the spinning step, the resilient bands 64 and 66 assume their lessstressed vertical positions as shown in FIG. 7C, so that they cause the bag 26 and its contents to resume their original upstanding shape, thereby maximizing again the aspect ratio of the bag and contents and raising the level of the liquid in the bag to its original level L.

The above apparatus embodiments 10, 42 and 52, all initially maintain bag 26 in a shape that maximizes its aspect ratio, but allows the bag and blood column therein to deform during centrifuging to the point where they conform to the triangular interior shape of the insert apparatus. Thus, during centrifuging, the insert constrains the bag and its contents to deform to a precisely defined repeatable shape that minimizes the aspect ratio. This, in turn, greatly increases the area of the bottom wall of the bag and lowers the level of the liquid in the bag. The latter effect creates the shortest possible distance for the different density components of the blood or other fluid inside the bag 26 to travel when separating or stratifying into a density distribution or continuum as represented by zones Z1 and Z2 in FIG. 7B. The former effect maximizes the flat surface area on which the densest fluid components may be distributed during centrifuging thereby minimizing the liklihood of the agglomeration or clumping together of those components, e.g. a platelet button, with resultant loss of component viability.

In the case of apparatus 52, towards the end of the centrifuge cycle, as the speed slows down to about 200–300 RPM, the bag 26 is returned to its mostly upright and stable position by bands 64 and 66 as shown in FIG. 7C. This maximizes again the aspect ratio of bag 26 and its contents thereby raising the surface of the liquid in the bag to its original level L and elongating the thus-formed different component density zones Z1 and Z2 so that, on average, the components have relatively long distances to travel in order to remix or recombine. This feature is particularly important in the case of blood cell separation where precise, repeatable partitioning of cells according to density is desired. After the centrifugation step, bags 26 and 28 are removed from the insert apparatus 10, 42 or 52 and placed in a conventional mechanical expressor or squeezer (not shown). The squeezer applies a gentle compressive force to the opposite sides of bag 26 to reduce the bag volume so that the liquid in the bag, stratified as aforesaid into zones Z1 and Z2, is expressed out of the bag through tube 32, one zone after the other. In other words, the uppermost least dense zone Z2 is expelled first from the bag, followed by the next lower more dense zone Z1 and so on to the lowest zone thus formed in the bag. Different zones may be routed into bag 28 or into other satellite bag(s) comprising the bag set by pinching off the different connecting tubes of the bag set in ways wellknown in the art.

In the case of RBC's, the volume of RBC's and, therefore, the relative age of the population of cells entering the second bag 28 can be controlled by controlling the liquid flow from the first bag 26 during expression by the mechanical squeezer. The volume of expressed liquid, and therefore its mean age, can be determined by weighing the second bag 28 during such expression and stopping at a specific volume representing the point at which all of the youngest RBC's, e.g. those from zone Z2, have entered the bag 28. Such controlled separation may also be accomplished by pre-establishing a volume of blood gerocytes, e.g. those in zone Z1, to be left in bag 26 and providing a pre-set or adjustable stop in the mechanical squeezer.

Figure 8A:
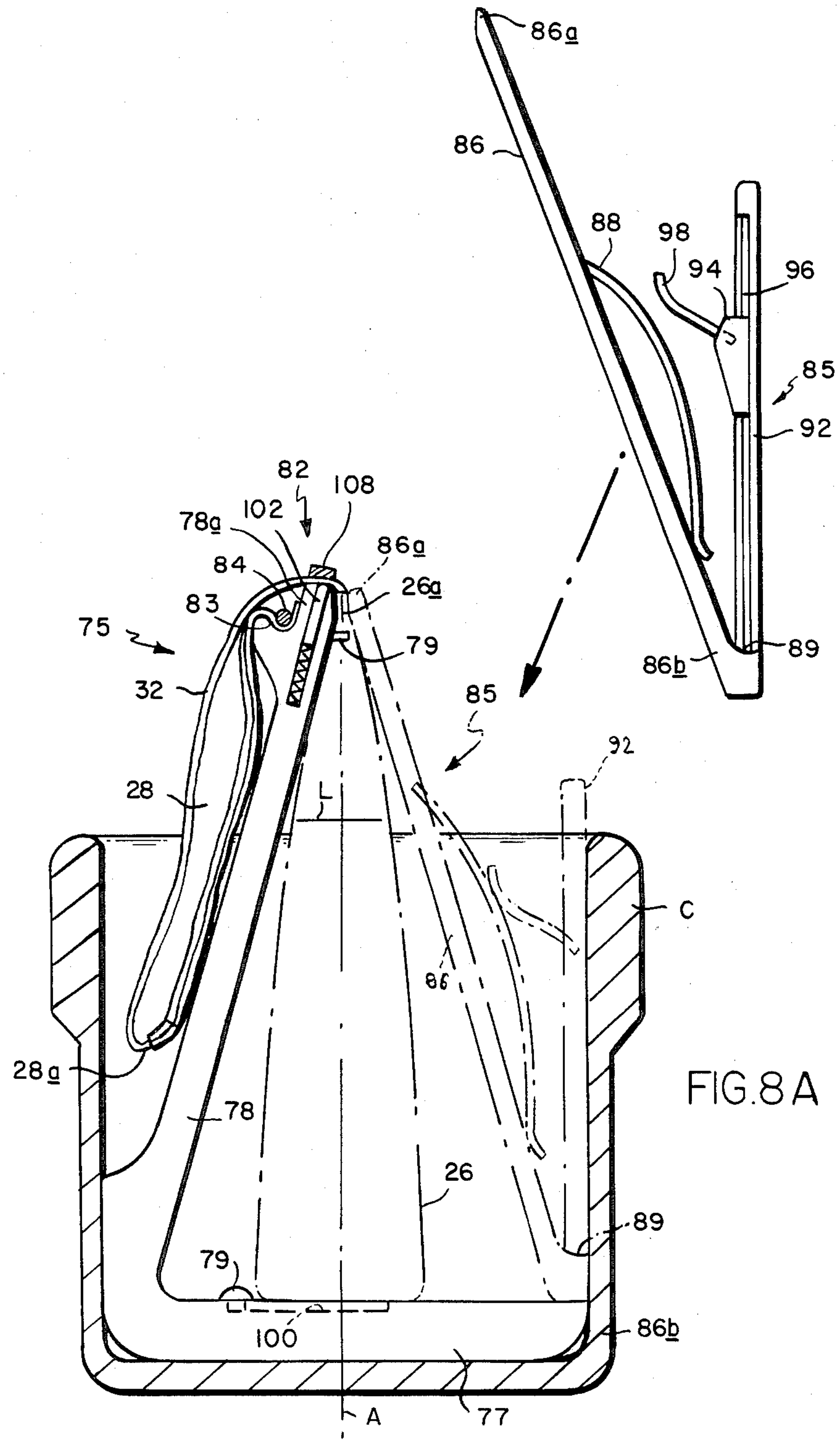
FIGS. 8A to 8C are similar views of a fourth embodiment of my invention showing the apparatus before, during and after centrifuging in a centrifuge cup.

Refer now to FIG. 8 which shows a fourth embodiment of my invention generally indicated at 75, which includes provision for automatically expressing the contents of bag 26 stratified into a density continuum as aforesaid. Apparatus 75 includes a circular base 77 for snug seating in a centrifuge cup C. A rectangular plate 78 extends up from one side of base 77 with its upper end 78*a* terminating adjacent to the vertical center line or axis A of the apparatus. A pair of laterally spaced-apart pins 79 project from the interior wall of plate 78 near the upper end thereof to support the header 26*a* of a blood bag 26 exactly as described above in connection with the FIG. 1 apparatus embodiment. Apparatus 75 also has an automatic gravity actuated valve assembly shown generally at 82 for controllably clamping the tube 32 leading from bag 26 to bag 28. The operation of assembly 82 will be described in detail later. Bag 28 is positioned upside down against the outside wall of plate 78, as shown in FIG. 8A. In other words, its header 28*a* is located adjacent to the bottom edge of that plate.

A laterally extending clip or channel 83 is mounted to the outside wall of plate 78 near the upper end thereof. The bottom edge margin of the upside-down bag 28 is arranged to be seated in channel 83 and is releasably retained there by a rod 84 which is press fitted into the clip on top of the bag margin, as shown in FIG. 8A. Such retention of the bag prevents the bag from collapsing into the bottom of cup C when the apparatus is spun at high speed in the centrifuge.

Still referring to FIG. 8A, apparatus 72 also includes a removable plate assembly shown generally at 85. Assembly 85 includes a rectangular plate 86 similar in shape and size to plate 78. Attached to an upper end segment 86*a* of that plate is the end of one or more leaf springs 88 which curve or bow outwardly and extend downwardly along the outside surface of plate 86. There may be a single relatively wide spring 88 or a plurality of such springs distributed over the width of plate 86.

The lower edge 86*b* of plate 86 is formed with an outwardly extending platform or ledge 89 for supporting the lower edge of an arcuate plate 92 whose cross-section has a curvature which conforms to the interior curvature of cup C.

A thrust block 94 is keyed into a vertical slot or keyway 96 formed in the inside wall of plate 92 so that the block can slide up and down on the plate. However, that block is spring-biased to an uppermost position in the keyway. Projecting inwardly and upwardly from that block is a second smaller leaf spring 98 which, when plate 92 is seated on ledge 89, is located directly opposite spring 88.

Plate assembly 85 is arranged to be positioned inside cup C so that the plate lower edge 86*b* rests on base 77 as shown in dotted lines in FIG. 8A. In this position, plate 92 of that assembly lies against the inside wall of cup C while plate 86 is tilted by springs 88 and 98 so that its upper edge 86*a* lies opposite the upper edge 78*a* of plate 78. In this position, it retains bag header 26*a* on pins 79 so that bag 26 hangs down more or less vertically on the apparatus axis A.

In describing the operation of this apparatus embodiment, we will assume that the bag 26 is filled with donor PRP or packed with red blood cells and that the valve assembly 82 pinches tube 32 (see FIG. 9) so that blood fluid cannot escape from bag 26 and thus has the level L shown in FIG. 8A.

Figure 8B:
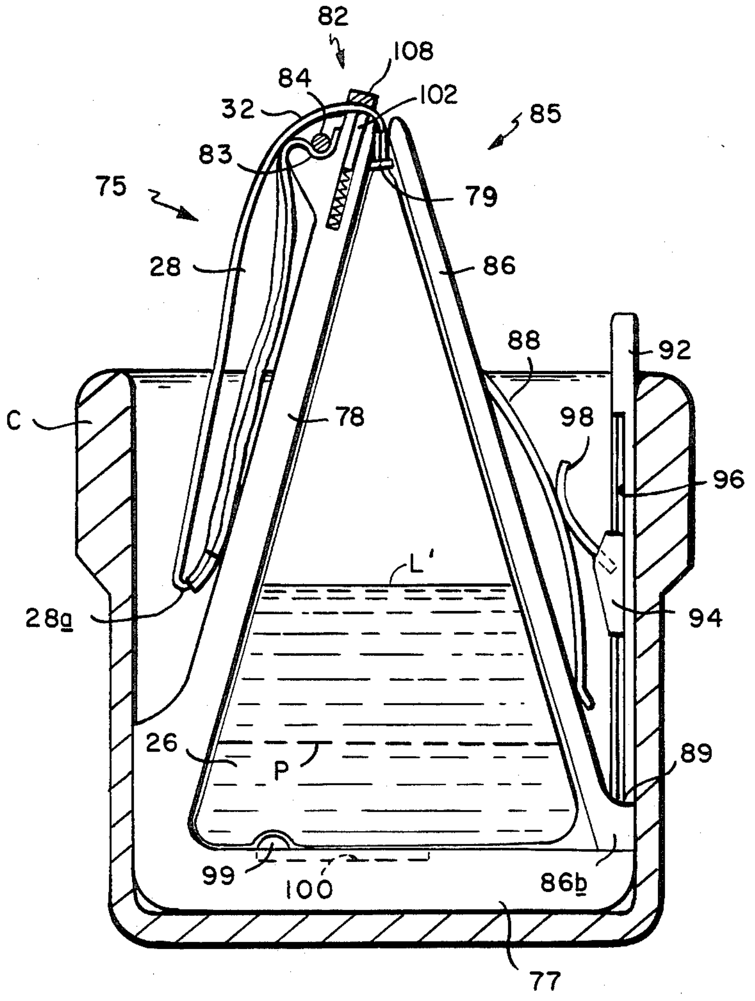

Turning now to FIG. 8B, in accordance with my separation technique, cup C is now spun in a centrifuge at a high speed subjecting it to a force in excess of 500 G and typically 2000 to 4000 G. The valve assembly remains closed until approximately 1500 G, thereby preventing the flow of liquid from bag 26 through tube 32 to bag 28 during the initial stage of centrifuging. As the spin velocity increases, the G forces on the thrust block 94 cause that block to slide down along keyway 96 toward the ledge 89. Consequently the inwardly bowed portion of spring 98 is brought opposite the outwardly bowed segment of spring(s) 88 so that the combination of springs 88 and 98 tends to collapse plate 86 toward plate 78. The extent of the movement of plate 86 can be controlled by a threaded stop member 99 which is adjustably slidably positioned in a keyway 100 in the upper surface of base 77. However, those same G forces urge the liquid in bag 26 away from the spin axis so that the liquid body forces plate 86 outward in opposition to the bias of springs 88 and 98. Resultantly, the bag 26 spreads apart to conform to the triangular shape of the space between plates 78 and 86 and the level of the liquid in bag 26 moves towards the bottom of the bag to the position indicated at L' in FIG. 8B while the liquid stratifies in a density continuum, all as described above.

Figure 8C:
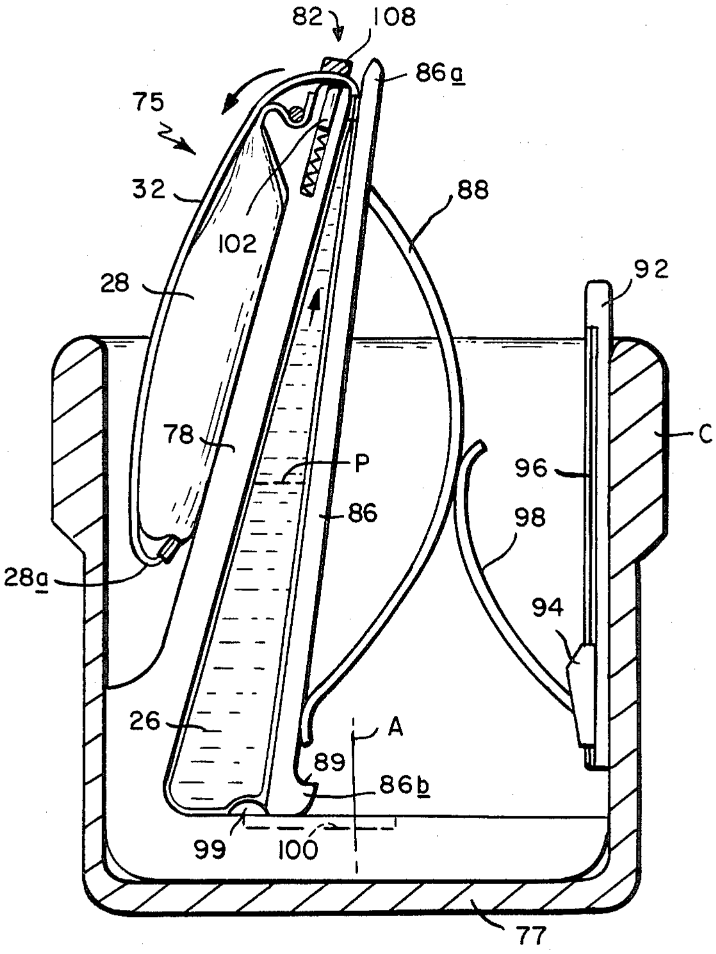

Towards the end of the centrifuge cycle, after the system has slowed to a relatively low speed that exerts a force on the apparatus of, say, 100 to 300 G, the combined forces of springs 88 and 98 exceed or overcome the force exerted on plate 86 by the spinning liquid mass so that plate 86 is moved toward plate 76 as indicated in FIG. 8C. Bag 26 is thus squeezed between the two plates so that liquid in the bag is expressed therefrom to bag 28 through tube 32, which is unblocked at this time because valve assembly 82 is open.

With fluid communication established between bags 26 and 28, the younger, lighter blood cells proximate to the centrifuge spin axis flow first through tube 32 into bag 28. This flow is continued until all of the cells or fluid from bag 26 above a selected imaginary partition line P in the density continuum established during centrifuging have enterered bag 28. In other words, the blood fraction density continuum, formed in bag 26 by centrifuging, is partitioned at a selected level or slice P in that continuum so that only blood fluid located above that partition line that exceeds a selected density flows into bag 28, the more dense cells below line P remaining in bag 26. Typically, in the case of platelet concentrate, all but approximately 50 cc of PPP is transfered to bag 28. The volume of fluid transfered, i.e., the level of partition line P, may be adjustably set by positioning the threaded stop member 99 at a selected position along its keyway 100. Thus, after the selected volume of fluid has been expressed from bag 26, the lower end 86*b* of plate 86 will engage stop 99 as shown in FIG. 8C, thereby preventing further compressive force on bag 26 and further expression of fluid from that bag.

The volume of blood cells or fluid entering the second chamber can also be controlled by properly selecting the volume of the bag 26. In other words, as the volume of that bag is made larger, less blood fluid can flow into the second bag 28 from bag 26, i.e., the partition line P in the blood fraction density continuum formed in bag 26 during centrifuging will be lowered, and vice versa. Thus, by properly selecting the volume of bag 26, one can control the average density of the red blood cells remaining in bag 26 after the separation and petition steps discussed above. In the case of platelet concentrate, bag 26 is typically selected to contain approximately 50 ml of plasma along with the platelets.

Since there is a direct relationship between red cell density and age as discussed above, one can also control the mean age of the cells remaining in bag 26. For example, one might select the volume of bag 28 so that it receives half of the red cells originally present in bag 26. In accordance with the above-cited Pionelli article, the 50% red cells (e.g. rabbit blood) transfered to bag 28 will survive in circulation for almost their finite lifespan of 56 days, while the older, denser cells still remaining in bag 26 after partitioning, initiate their aging loss almost immediately after reinfusion into the patient's circulation. Thus, the patient infused with new cells will require fewer transfusions and, therefore, will accumulate less iron in the circulatory system over a given period of time.

After the blood sample has been separated and partitioned as aforesaid, bags 26 and 28 are isolated by appropriately sealing tube 32, such as by heat sealing the tube at two spaced-apart locations and then severing the tube between the seals thereby separating the bag set into two independent sterile bags or chambers, one of which contains blood gerocytes and the other of which contains blood neocytes of a selected mean age along with the blood plasma. Various optional fluids or solutions may be added to the gerocytes to lower viscosity and to provide nutrition for the plasma-depleted gerocytes as is well-known in the art. The contents of chamber 26 can be used for experimentation, blood tests, transfusion, acute blood loss, etc.; the contents of bag 28 can be used as donor blood for those suffering from chronic anemia or for other patients who require younger blood cells.

Figure 9:
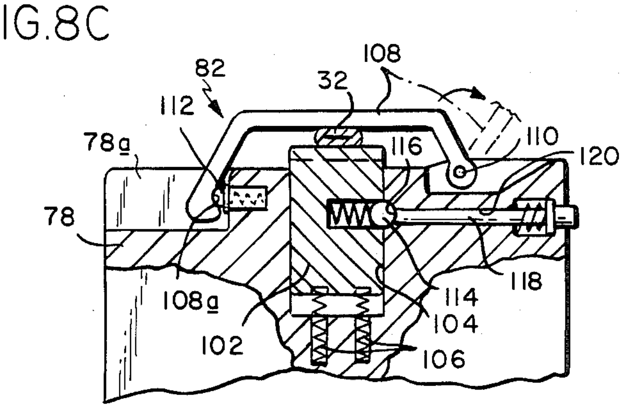
FIG. 9 is a fragmentary sectional view on a much larger scale showing a portion of the FIGS. 8A to 8C apparatus in greater detail.

Refer now to FIG. 9 which illustrates the valve assembly 82 in greater detail. The assembly comprises a generally rectangular plate or gate 102 having appreciable mass positioned in a vertical slot 104 in the upper end of plate 78. Gate 102 is biased upwardly in slot 104 by a pair of coil springs 106 compressed between the bottom of slot 104 and the lower edge of gate 102. The springs thus urge the gate upwards out of slot 104 so that it projects above the upper end 78*a* of plate 78 as shown in solid lines in FIG. 9. A latch 108 is hinged at 110 to plate 78 and is swingable between an open position shown in phantom in FIG. 9 and a closed position shown in solid lines in that figure. The latch is releasably retained in its closed position by a spring-loaded ball 112 mounted in plate 78 and which engages in a lip 108*a* at the free end of that latch. When a bag set is positioned in the insert apparatus 75, its tube 32 is placed on gate 102 and then latch 108 is closed so that the tube is pinched off thereby preventing fluid flow from bag 26.

When the apparatus is spun at a speed of, say, 1500 RPM, centrifugal force retracts gate 102 to a dotted line position shown in FIG. 9, thereby unblocking tube 32. The gate is held open by a spring-loaded pin 114 in the gate which engages in a hole 116 in plate 78 so that when the centrifuge slows down, the gate remains retracted. However, there is no fluid flow through the open tube 32 because the spinning places all of the fluid in bag 26 at the bottom of the bag away from the tube entrance (see FIG. 8B). The gate may be extended again after the spinning stops by pushing on the end of spring loaded a rod 118 slidably mounted in a passage 120 in plate 78 which, in turn, pushes the ball 114 out of hole 116.

The merits of my invention will be evident from the following examples:

EXAMPLE 1

Comparison of Techniques and Resulting In Vitro Data

My technique is compared to AABB recommended protocols using paired studies (N=5). A PRP pool was made from 2 to 4 units of ABO compatible donors. The pool was split evenly between CLX 7-day platelet bags from the Cutter Biological Company. Platelets were separated using a Sorval RC-3 centrifuge with swing heads, HG-4 rotor. Following the indicated protocols (see FIG. 10), units of platelet concentrate (PC) were made in 52G (+2G) plasma, left to rest for one hour (see exception in Example 2), and placed on a flatbed shaker (Heimler). Samples were aseptically taken at indicated points and assayed as noted for pH, $PCO_2$, $PO_2$, platelet counts, recovery from hypotonic stress, B thromboglobulin (BTG) release, aggregation (10 ADP) and platelet factor (PF3) availability.

Results

Figure 11:
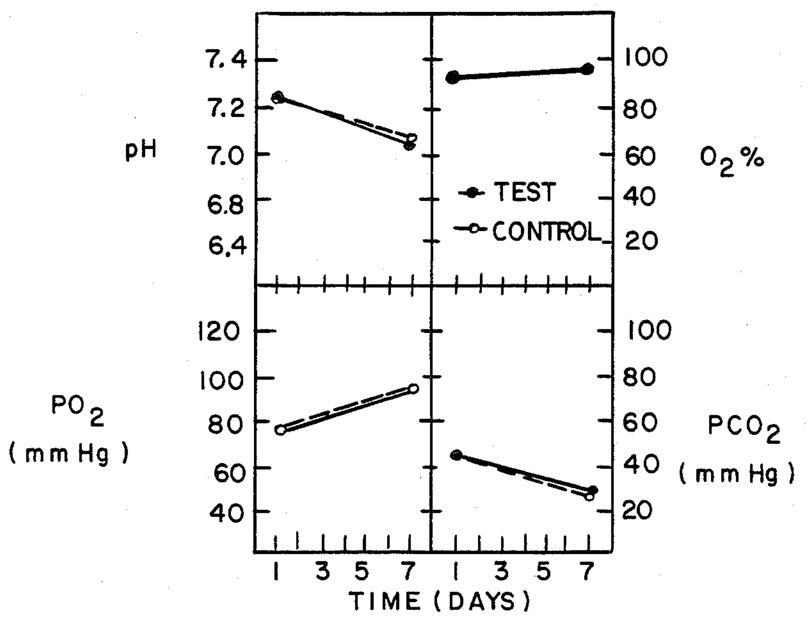
Figure 12:
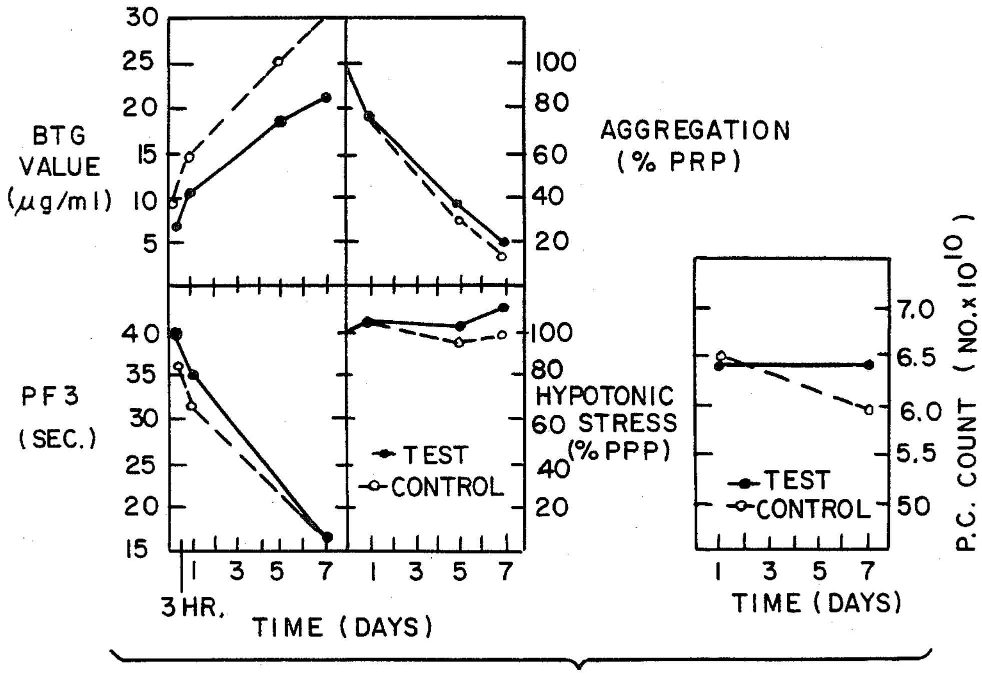

The two procedures have similar blood gas results (see FIG. 11). The platelet count drop was 6.5% less with my technique than with the control on day seven. Each technique yielded 95% of PRP platelets. ADP induced aggregation was slightly better on days five and seven. Stypven clotting time was longer for my technique at hour three and day one, but times were nearly the same on day seven. BTG release was consistently greater from three hours to day seven on the control units. Recovery from hypotonic stress was uniformly improved with my technique (see FIG. 12).

EXAMPLE 2

PC Resuspension Without Rest Period

The AABB technical manual suggests a one hour rest period for PC prior to gentle manipulation to resuspend the platelet button to avoid irreversible macroaggregate formation. Elimination of this step is advantageous to blood processing facilities.

Eight ABO compatible units of PRP were pooled and divided into eight CLX bag sets. Three of the units (A) were prepared with my technique and placed immediately on a Heimler end-over-end agitator; three units (B) were similarly prepared and left to rest for one hour before agitation; the remaining two units (C) were prepared using the standard AABB protocol and left to rest one hour before agitation.

Visual observations of macroaggregates were taken every 20 minutes for two hours after each unit was placed on the agitator. Samples were taken for platelet counts at 3 hours and 24 hours. An Abbott blood SE filter (120 microns) was connected to the primary bag to filter the 3 MI sample. A fresh filter was used on each bag at both three hours and 24 hours.

Results

Larger macroaggregates were visible in the "A" units (with no rest) compared to the "B" units (with rest) and "C" units (standard control) at 20 minutes post agitation. No visible aggregates were noticed in the "B" units after 60 minutes of agitation. "A" units had small aggregates at 60 minutes, but they diminished to acceptable levels at 120 minutes of continuous agitation. The "C" units had similar aggregates to the "A" units at 60 minutes and 120 minutes of agitation. After 24 hours of agitation, no visible aggregates were visible in the "B" units, two or three (1 mm) macroaggregates per bag were seen in the "A" units, eight (1 mm) macroaggregates were counted in unit $C_1$, none were counted in unit $C_2$. Platelet counts were similar at three hours for the "B" and "C" units, slightly lower for the "A" units. At 24 hours, all units showed similar increases in platelet count (see FIG. 13). Thus, based solely on platelet count, my technique may allow elimination of the rest period without irreversible macroaggregate formation.

EXAMPLE 3

Pediatric Platelet Concentrate Preparation

Platelet concentrate prepared for pediatric use is typically respun to remove 30 ml of the unit's 50 ml plasma to avoid hypervolemia in the patient. Pediatric respun units should be of the highest quality and available in the shortest period of time. My technique was evaluated to determine its ability to concentrate the PC with less force and to monitor the resuspension time of the respun platelet button.

Units of PC (50 5) were respun with my centrifuge insert and the standard (control) time/speed used by Boston Childrens Hospital in preparation of pediatric PC (n=5). FIG. 14 illustrates the elapsed time in both the test and control modes. After preparation, all units were placed on a Heimler side-to-side agitator. Pre and post-spin counts of the PC and respun PPP were taken. Periodic visual observations were made for macroaggregate formation in the respun PC. Results:

Platelets respun using my technique are subjected to 46% less total force (RCF x time) than standard control units. The resulting platelet viability was not checked, but is expected to be higher due to the gentler method of preparation. Macroaggregates in my units were almost totally absent after 45 minutes of agitation. Control units had macroaggregates after more than two hours of agitation. (Note: In visual observations of some standard pediatric platelet units, macroaggregates were visible after up to six hours of agitation, suggesting irreversible aggregation.) Platelet counts 45 minutes after preparation of the resuspended platelets indicated a higher count for my technique vs. the control. Counts of the PPP indicate a greater loss of platelets in the removed plasma of the control unit (see FIG. 15). The total count of the respun platelets may have increased after a longer interval of agitation. No counts were taken other than the 45 minute count.

This example indicates that my method is gentler in the preparation of pediatric platelets with less loss of platelets and with a higher platelet count in the PC than is the case with the control units.

It will be appreciated from the foregoing that my method and apparatus permit blood and other fluids to be separated and to be partitioned at substantially any point along a density or age continuum on a high volume basis, while remaining in a sterile environment. The geometries of my various apparatus embodiments assure that the volume of fluid being separated has a minimum aspect ratio during centrifuging which assists cell migration, improves the purity of separation, and minimizes the force used in harvesting the blood components so that component viability is enhanced in one embodiment, and, upon completion of centrifugation, has a maximum aspect ratio to avoid remixing of the separate fluid components. Yet, the apparatus embodiments are relatively easy and inexpensive to make and they are also easy to use and maintain by relatively unskilled personnel.

It will also be seen that the objects set forth above, amoung those made apparent from the preceding description, are efficiently attained. Also, certain changes may be made in the above constructions and in the method set forth. For example, some glucose solutions administered to patients contain charcoal so that they can be reused. The present method and apparatus may be used to separate the charcoal from the glucose as well as to separate different density components of other fluids. Therefore, it is intended that all matter contained in the above description or shown in the accompanying drawings shall be interpreted as illustrative and not in a limiting sense.

What is claimed as new and desired to be secured by Letters Patent of the United States is:

1. The method of separating different density fluid components comprising the steps of A. placing a sample of said fluid in a first flexible container having side walls and a bottom; and B. spinning said container and its contents at a high speed while controlling the shape of said container so that its side walls spread apart and the container bottom flattens whereby the container and its contents have a relatively small aspect ratio so that different density components of said fluid travel minimum distances while separating in said container to achieve a density distribution in said container, with the densest components of said fluid distal to the spin axis being distributed over a relatively large area surface constituted by the container bottom.

2. The method defined in claim 1 and including the additional step of reshaping the container and its contents following said spinning so as to give them a relatively large aspect ratio to minimize any tendency of the separated fluid components to remix.

3. The method defined in claim 1 and including the additional step of partitioning the distributed fluid components at a selected partition line in the density distribution by flowing the fluid component volume on the side of said partition line proximal to the spin axis out of said first container into a second container.

4. The method defined in claim 3 wherein said flowing occurs between containers constituted by first and second bags of an integral fluid-tight bag set.

5. The method defined in claim 3 wherein said flowing is encouraged by exerting pressure on the fluid in the first container.

6. The method defined in claim 5 and including the further step of isolating the first and second containers after said partitioning step.

7. The method defined in claim 1 wherein said high speed spinning step produces a centrifugal force on the container in excess of 500G.

8. The method of separating higher and lower density components of a fluid into different, interconnected, flexible bags of a fluid-tight, plural-bag set comprising the steps of A. placing a sample of the fluid in a first bag of the bag set; and B. spinning the bag set at a high speed while controlling the shape of the first bag and its contents so that they have a relatively small aspect ratio while preventing fluid flow from said first bag until the fluid components in that bag are distributed over a density continuum with the densest components being distal to the spin axis.

9. The method defined in claim 8 and including the additional step of partitioning the fluid components distributed in said first bag following completion of said high speed spinning step, while said first bag and its contents have a second aspect ratio appreciably greater than said first ratio, at a selected partition line in the density continuum by exerting pressure on the fluid in said first bag while allowing only the fluid on the side of said partition line proximal to the spin axis to flow from said first bag to a second bag of the bag set; and subsequently blocking further fluid flow from said first bag.

10. The method defined in claim 9 and including the additional steps of sealing and separating the interconnection between said first and second bags so as to isolate the contents of those bags.

11. Appararatus for separating different density fluid components according to their densities while spinning in a centrifuge cup, said apparatus comprising A. a base having a centerline and for seating in the bottom of the centrifuge cup; and B. a pair of opposite side plates projecting upwardly and inwardly from the base toward said base centerline, the free ends of said plates being spaced relatively close to one another on opposite sides of said centerline, said base and side plates together defining an enclosure whose cross-sectional area is less at points on the centerline further away from the base so that a flexible blood bag can be supported from one end at a location between said plate free ends so that the bag extends along said base centerline, at least one of said plates being movable relative to the base so that the free end of said one plate can be moved to some extent toward and away from said centerline.

12. The apparatus defined in claim 11 and further including means at the free end of at least one of said side plates for securing a bag to said one plate.

13. The apparatus defined in claim 12 and further including a flexible bag with an outlet tube extending from one end of the bag, said bag being positioned in said enclosure with said bag one end being secured by said securing means so that said bag extends along said base centerline and the bag tube projects out from between said side plate free ends.

14. The apparatus defined in claim 13 and further including tube clamping means mounted to the free end of a side plate of said pair of side plates, said clamping means being arranged to engage said bag tube and being responsive to centrifugal force so that the clamping means clamp said tube so as to block fluid flow therethrough prior to the apparatus being spun while in the centrifuge cup and unclamp the tube in response to centrifugal force developed when the apparatus is spun while in the centrifuge cup.

15. The apparatus defined in claim 11 wherein said one plate is hinged to said base so that it is movable relative thereto.

16. The apparatus defined in claim 11 wherein said one plate is flexible and resilient so that it is movable relative to said base.

17. The apparatus defined in claim 11 wherein said one plate is slidably supported by said base so that it is movable relative to said base.

18. The apparatus defined in claim 17 and further including means responsive to centrifugal force for urging said one plate toward the opposite plate so as to compress a flexible bag positioned in said enclosure after the apparatus has been spun while in the centrifuge cup thereby to expel bag contents from the bag.

19. The apparatus defined in claim 11 and further including a pair of elastic bands stretched between said base and said side plates, said bands extending substantially parallel to the base centerline on opposite sides thereof.

* * * * *